United States Patent
Tuncel (10) Patent No.: US 12,271,856 B2
(45) Date of Patent: Apr. 8, 2025

(54) APPARATUS TO PROTECT AND MONITOR PACKAGES

(71) Applicant: Levent Tuncel, Atlanta, GA (US)

(72) Inventor: Levent Tuncel, Atlanta, GA (US)

(*) Notice: Subject to any disclaimer, the term of this patent is extended or adjusted under 35 U.S.C. 154(b) by 104 days.

(21) Appl. No.: 18/342,834

(22) Filed: Jun. 28, 2023

(65) Prior Publication Data

US 2025/0005499 A1  Jan. 2, 2025

(51) Int. Cl.
| | |
|---|---|
| G06Q 10/0832 | (2023.01) |
| G06Q 10/0833 | (2023.01) |
| H04W 4/029 | (2018.01) |
| H04W 4/38 | (2018.01) |

(52) U.S. Cl.
CPC ..... G06Q 10/0832 (2013.01); G06Q 10/0833 (2013.01); H04W 4/029 (2018.02); H04W 4/38 (2018.02)

(58) Field of Classification Search
CPC .............................. G06Q 10/0832; H04W 4/38
See application file for complete search history.

(56) References Cited

U.S. PATENT DOCUMENTS

| | | | | |
|---|---|---|---|---|
| 3,765,711 A | * | 10/1973 | Hammond | B66C 1/127 |
| | | | | 294/76 |
| D801,909 S | * | 11/2017 | Tuncel | D12/403 |
| 2010/0294122 A1 | * | 11/2010 | Hoadley | F41H 11/02 |
| | | | | 89/36.02 |
| 2020/0255149 A1 | * | 8/2020 | DeVerter | B64D 9/003 |
| 2020/0255150 A1 | * | 8/2020 | DeVerter | B64C 1/22 |
| 2021/0009310 A1 | * | 1/2021 | Moeller | G06K 19/07786 |
| 2021/0262877 A1 | * | 8/2021 | Hansen | A01K 75/00 |
| 2022/0032927 A1 | * | 2/2022 | Keene | B64F 1/368 |

FOREIGN PATENT DOCUMENTS

WO   WO-2008110328 A1  *  9/2008  ............ B60P 7/0876

* cited by examiner

*Primary Examiner* — Lucas E. A. Palmer (57) ABSTRACT

An apparatus to protect and monitor packages during shipment includes a netting body, a plurality of load sensors, a global positioning system (GPS) unit, a power source, a wireless communication unit, and a chipset. The netting body that functions as a flexible package covering body includes a webbing section and an outer strap, as the outer strap is perimetrically connected around the webbing section. The plurality of load sensors that detects additional weight that may be placed on top of the netting body is integrated into the webbing section. The GPS unit, the power source, the wireless communication unit, and the chipset are integrated into the webbing section. The plurality of load sensors, the GPS unit, the wireless communication unit, and the chipset are electrically connected to the power source. The plurality of load sensors, the GPS unit, and the wireless communication unit are electronically connected to the chipset.

18 Claims, 8 Drawing Sheets

APPARATUS TO PROTECT AND MONITOR PACKAGES

FIELD OF THE INVENTION

The present invention relates generally to an apparatus to protect and monitor packages during shipment. More specifically, the present invention is able to electronically detect additional weights that are placed over the package during shipment so that the operators and the clients can be notified to ensure the integrity of the package.

BACKGROUND OF THE INVENTION

Delivery services are a necessity for man businesses which require timely shipment of packages without suffering damage. Unfortunately, many packages get damaged during shipment and is not an uncommon occurrence. One such cause of damage is the stacking of packages, with packages on a bottom level being compressed beneath the weight of the packages above. Provided sufficient loads, even packages that normally would be considered durable can suffer damage. Even when damages are covered by the carrier or the shipper, the client must spend time filing a claim; in some circumstances, a carrier can even deny the claim. It is therefore very desirable for shippers to avoid damage to their packages in the first place. While some carriers offer separate levels of service for "fragile" products, such services are often too costly to be used for volume shipping. To provide a less costly alternative, some shippers have taken to placing cones atop their packages to prevent stacking of packages. However, these cones are not reusable and thus become an added cost over time. Placement of shipping cones may be cheaper than paying for separate service levels, but it is still desirable for there to be a reusable means of protecting a package that can electronically track the entire length of the shipping process.

It is therefore an object of the present invention to provide an apparatus to protect and monitor packages that allows shippers to protect and monitor their packages during shipment. The present invention does so by incorporating an electronic system with load sensors, alarms, and a tracking unit. The load sensors can detect when weight is placed on the package, which causes the alarms to go off. The weight of the load placed on the package, as well as the specific area of the package, can be transmitted to the shipper through a smartphone application. The geographical location in which the load sensors are triggered can also be recorded and transmitted. The smartphone application allows a shipper to input and track packages by scanning a barcode and entering relevant package information. The present invention, by means of the load sensors, helps shippers prevent damage during shipping. The present invention further assists shippers with filing claims for damaged packages by providing evidence that the damage occurred due to actions of the carrier.

DETAIL DESCRIPTIONS OF THE INVENTION

All illustrations of the drawings are for the purpose of describing selected versions of the present invention and are not intended to limit the scope of the present invention.

Figure 1:
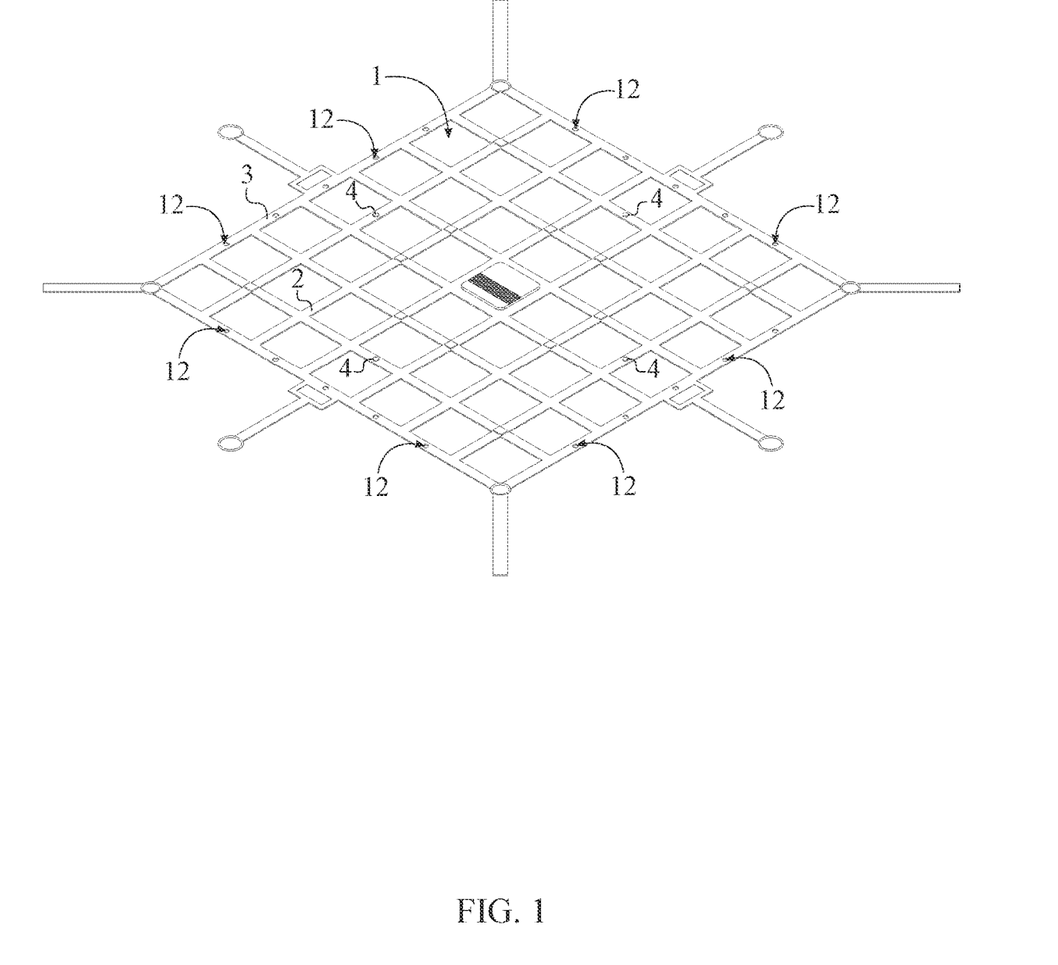
FIG. 1 is a top perspective view of the present invention.
Figure 2:
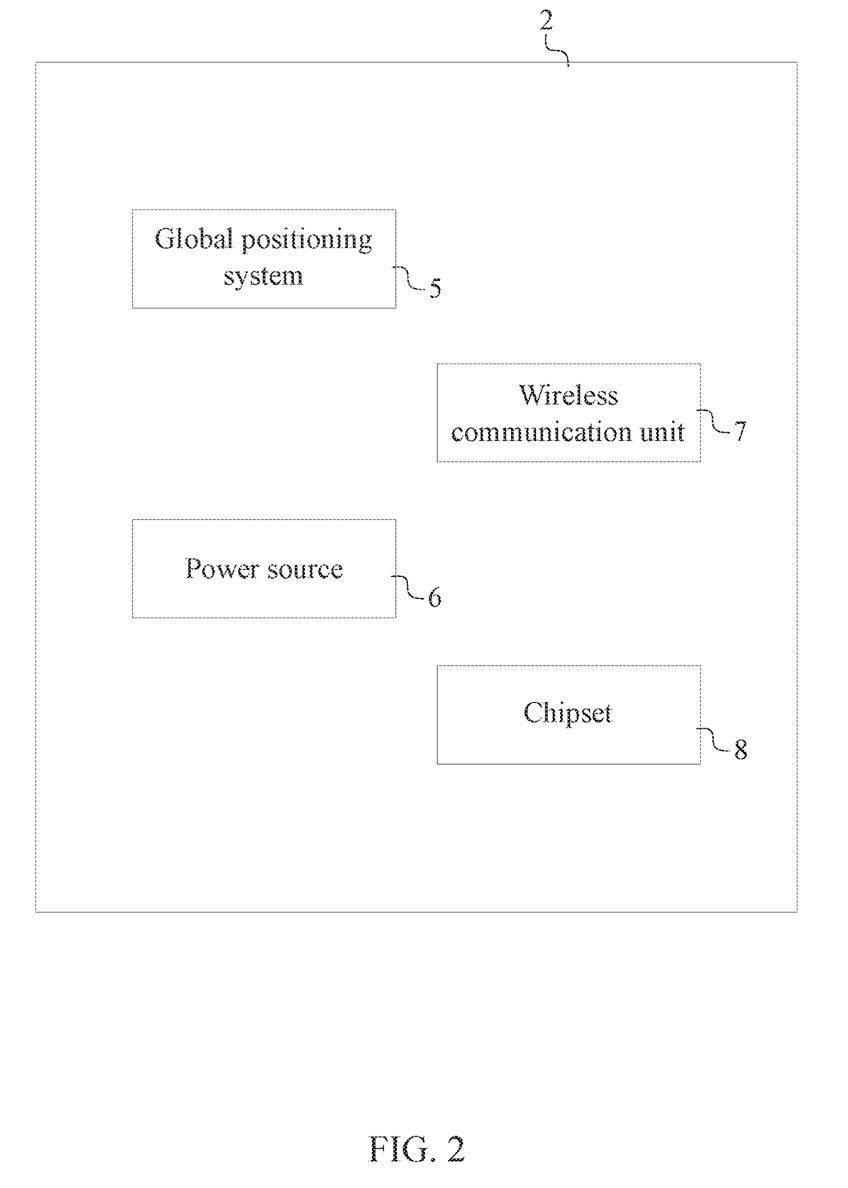
FIG. 2 is a schematic view showing positioning of the global positioning system (GPS) unit, the power source, the wireless communication unit, and the chipset of the present invention.

The present invention is an apparatus to protect and monitor packages during shipment so that the shipping process of the package can be electronically monitored and tracked. More specifically the present invention is a lattice structure that is placed atop the package to detect additional weight that may be placed on top of the package during shipment. The present invention is communicably coupled with an electronic application that is executed through a smart phone or electronic tablet so that the shipper and the client can electronically track and monitor the entire shipping process. As shown in FIG. 1 and FIG. 2, the present invention comprises a netting body 1, a plurality of load sensors 4, a global positioning system (GPS) unit 5, a power source 6, a wireless communication unit 7, and a chipset 8.

In reference to FIGS. 1 and 2, the netting body 1 is a flexible body that can easily be positioned atop the package being prepared for shipping. The netting body 1 comprises a webbing section 2 and an outer strap 3. More specifically, the outer strap 3 is perimetrically connected around the webbing section 2 as the outer strap 3 and the webbing section 2 function as the structural platform for the rest of the components of the present invention. As mentioned, the webbing section 2 is preferably configured in with a plurality of perpendicularly positioned straps so that the webbing section 2 can be easily placed over the package. Preferably, each of the plurality of perpendicularly positioned straps is double layered thus creating an interior space. The interior space can then be utilized to position electrical wiring that completes electrical connections of the present invention. Optionally, the interior space can also be utilized to position the GPS unit 5, the power source 6, the wireless communication unit 7, and the chipset 8 if necessary. Resultantly, each of the plurality of perpendicularly positioned straps is able to protect internally position components from water, dust, and other hazardous conditions. The outer strap 3 functions as the outer structural edge of the netting body 1 so that the netting body 1 can be stretched and secured over the package.

In reference to FIG. 2, the power source 6 is integrated into the webbing section 2 so that electrical components of the present invention can be powered. More specifically, a rechargeable lithium ion battery is utilized as the power source 6 to optimize the operation of the present invention. Furthermore, the power source 6 is internally mounted within the interior space via an access panel or mounted onto the webbing section 2 so that the shipper and the client can easily access the power source 6 for potential repairs or replacement.

Figure 7:
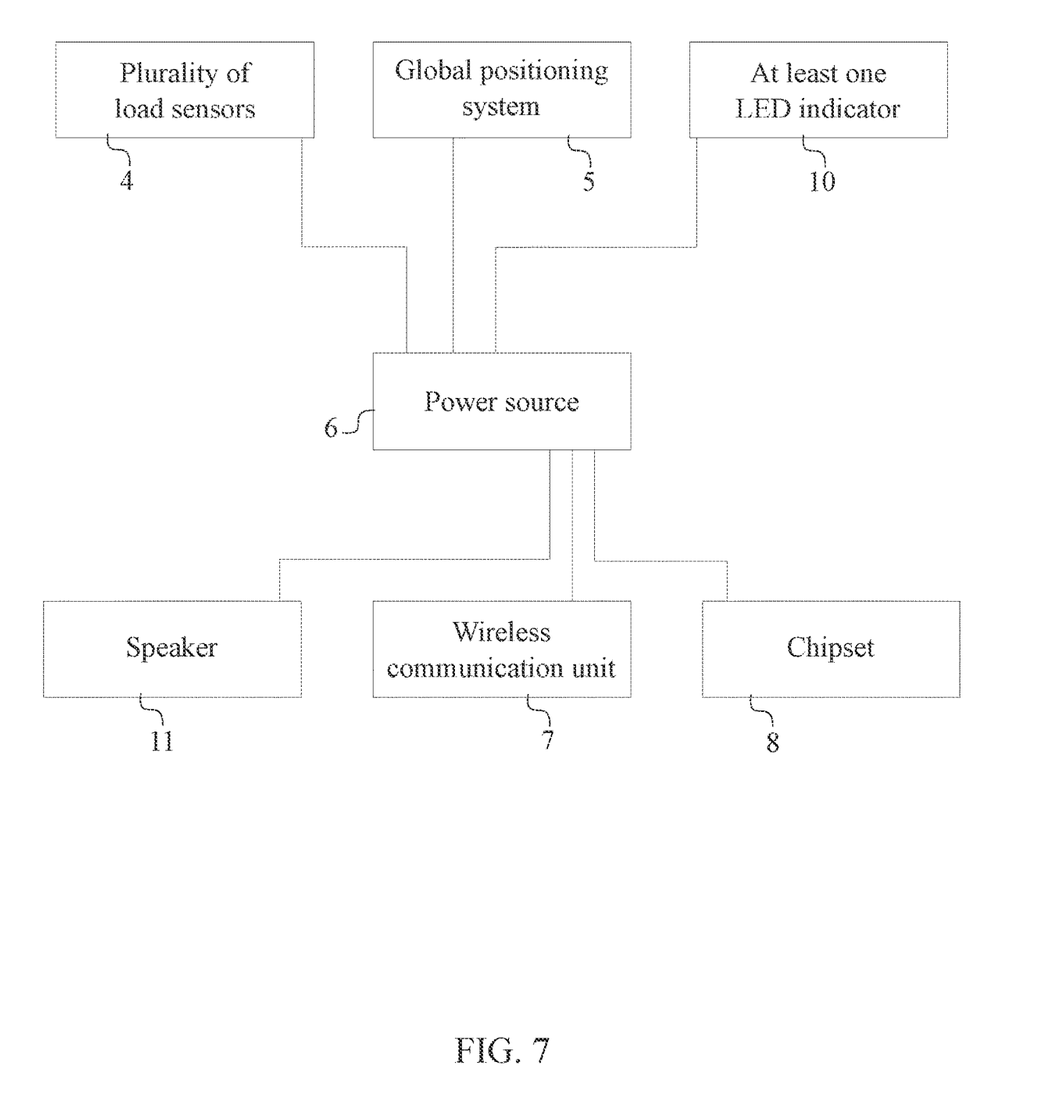
FIG. 7 is a schematic view showing the electrical connections of the present invention.
Figure 8:
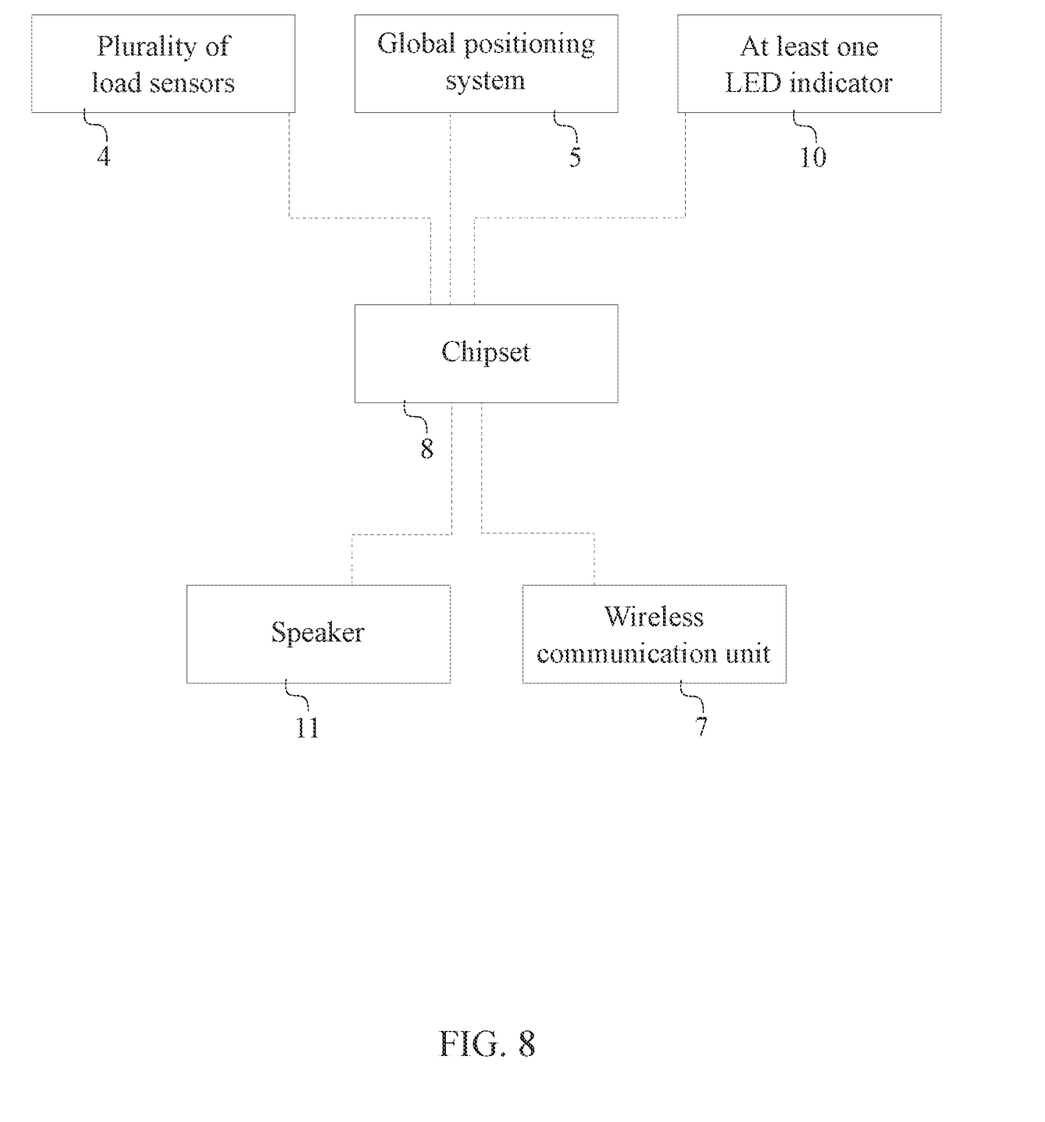
FIG. 8 is a schematic view showing the electronic connections of the present invention.

In reference to FIG. 2, FIG. 7, and FIG. 8, the wireless communication unit 7 is integrated into the webbing section 2, thus facilitating wireless communication between the present invention and the electronic application. The wireless communication unit 7 is electrically connected to the power source 6 so that the wireless communication unit 7 can be powered and operational. The wireless communication unit 7 is electronically connected to the chipset 8 so that the wireless communication unit 7 is able to communicate with the chipset 8 to send out notifications to the electronic application.

In reference to FIG. 2 and FIG. 7, the chipset 8 is integrated into the webbing section 2 and functions as the main computing device and executes the data flow management. The chipset 8 is electrically connected to the power source 6 so that the chipset 8 can be powered and operational. In other words, the chipset 8 controls communication between the present invention and electronic application so that the shipper and the client is able to electronically track the entire length of the shipping process.

In reference to FIG. 2, FIG. 7, and FIG. 8, the GPS unit 5 is integrated into the webbing section 2 so that the package can be tracked in real-time. In other words, the GPS unit 5 is able to locate the package at any moment in time. The GPS unit 5 is electrically connected to the power source 6 so that the GPS unit 5 can be powered and operational. The GPS unit 5 is electronically connected to the chipset 8 so that the GPS unit 5 is able to communicate with the chipset 8 to send out notifications to the electronic application through the wireless communication unit 7. For example, the shipper can track movements of the package through the GPS unit 5. Once the package reaches its destination, the wireless communication unit 7 is able to send out a delivery notification to the shipper and the client that informs the package has been delivered.

Figure 4:
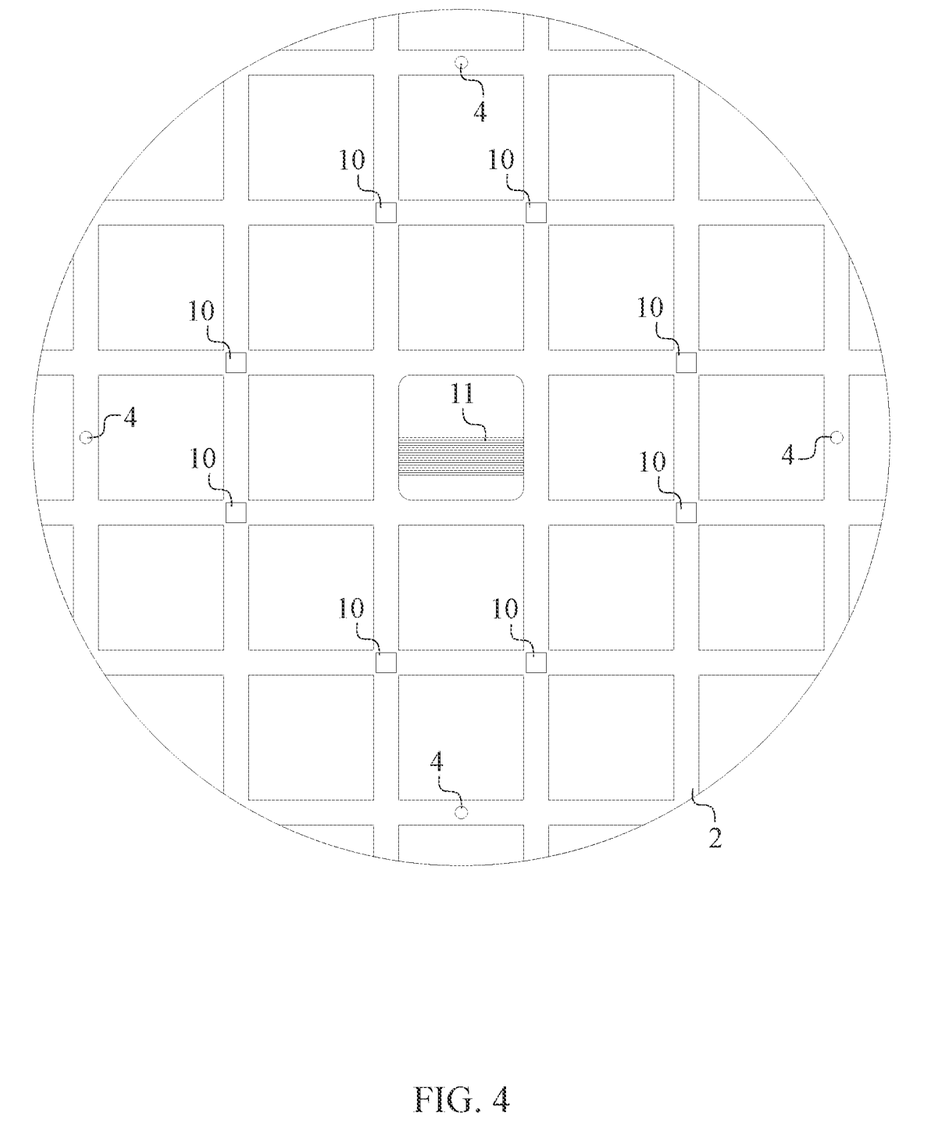
FIG. 4 is a detailed sectional view taken about circle 4 in FIG. 3.

In reference to FIG. 1 and FIG. 4, the plurality of load sensors 4 is integrated into the webbing section 2 so that the plurality of load sensors 4 is able to detect additional weight that is placed atop the package. Preferably, each of the plurality of load sensors 4 is positioned at each vertex of the webbing section 2 as an intersection point of two straps from the plurality of perpendicularly positioned straps is identified as the vertex. Resultantly, the plurality of load sensors 4 is able efficiently detect applied load on the package with reference to each vertex of the webbing section 2. The plurality of load sensors 4 is electrically connected to the power source 6 so that the plurality of load sensors 4 can be powered. The plurality of load sensors 4 is electronically connected to the chipset 8 so that the plurality of load sensors 4 is able to communicate with the chipset 8 to send out notifications to the electronic application and trigger an alarm system. Preferably, the plurality of load sensors 4 has a user-adjustable threshold; this enables the shipper to set a specific weight that can trigger the plurality of load sensors 4. Ideally, the threshold value is high enough so that the plurality of load sensors 4 does not trigger accidentally. For example, when a cat or other animal sitting on the package does not trigger the plurality of load sensors 4 as the weight of the animal is smaller than the threshold value. The threshold value could also be adjusted according to the durability of the package being shipped. For example, the plurality of load sensors 4 can be given a lower threshold value when a package is filled with fragile items. The plurality of load sensors 4 can be given a higher threshold value when a package is filled with durable and rigid items. Furthermore, when a single sensor from the plurality of load sensors 4 is triggered, the present invention is able to individually identify the triggered sensor. For example, when a single sensor from the plurality of load sensors 4, that is positioned at a left corner of the package, is triggered, the shipper and the client knows to check the left corner of the package for damage thus expediting insurance claims for potential damaged products.

The alarm system of the present invention can be a visual alarm so that the shipper can be alerted during the shipping process. In reference to FIG. 4, the present invention may further comprise at least one light-emitting diode (LED) indicator. The at least one LED indicator 10 is connected onto the webbing section 2 so that the illumination of the at least one LED indicator 10 can easily be detected. As the webbing section 2 is likely to encounter a variety of weather conditions, the at least one LED indicator 10 is preferably encased in weatherproof boxes positioned across the webbing section 2. The weatherproof boxes ensure that water, dirt, debris, and other contaminants do not impede the functionality of the at least one LED indicator 10. The at least one LED indicator 10 is electrically connected to the power source 6 so that the at least one LED indicator 10 can be powered and operational. The at least one LED indicator 10 is electronically connected to the chipset 8 so that the at least one LED indicator 10 can be activated as the plurality of load sensors 4 is triggered. In addition to the activation of the at least one LED indicator 10, the chipset 8 also send out a triggered-alarm notification to the shipper and the client through the wireless communication unit 7 to identify damages and assist with insurance claims.

The alarm system of the present invention can be an audible alarm so that the shipper can be alerted during the shipping process. In reference to FIG. 4, the present invention may further comprise a speaker 11. The speaker 11 is connected onto the webbing section 2 so that the emitting sounds of the speaker 11 can easily be detected. As the webbing section 2 is likely to encounter a variety of weather conditions, the speaker 11 is preferably encased in weatherproof boxes positioned across the webbing section 2. The weatherproof boxes ensure that water, dirt, debris, and other contaminants do not impede the functionality of the speaker 11. The speaker 11 is electrically connected to the power source 6 so that the speaker 11 can be powered and operational. The speaker 11 is electronically connected to the chipset 8 so that the speaker 11 can be activated as the plurality of load sensors 4 is triggered. In addition to the activation of the speaker 11, the chipset 8 also send out a triggered-alarm notification to the shipper and the client through the wireless communication unit 7 to identify damages and assist with insurance claims.

It is possible that the present invention can incorporate both the at least one LED indicator 10 and the speaker 11. It is also possible that the present invention can incorporate either the at least one LED indicator 10 or the speaker 11. For example, when there are noise restrictions in the service area, illumination of the at least one LED indicator 10 can serve as the triggered alarm notification. When the service area is heavily illuminated and illumination of the at least one LED indicator 10 is not visible, the speaker 11 can serve as the triggered alarm notification.

Figure 3:
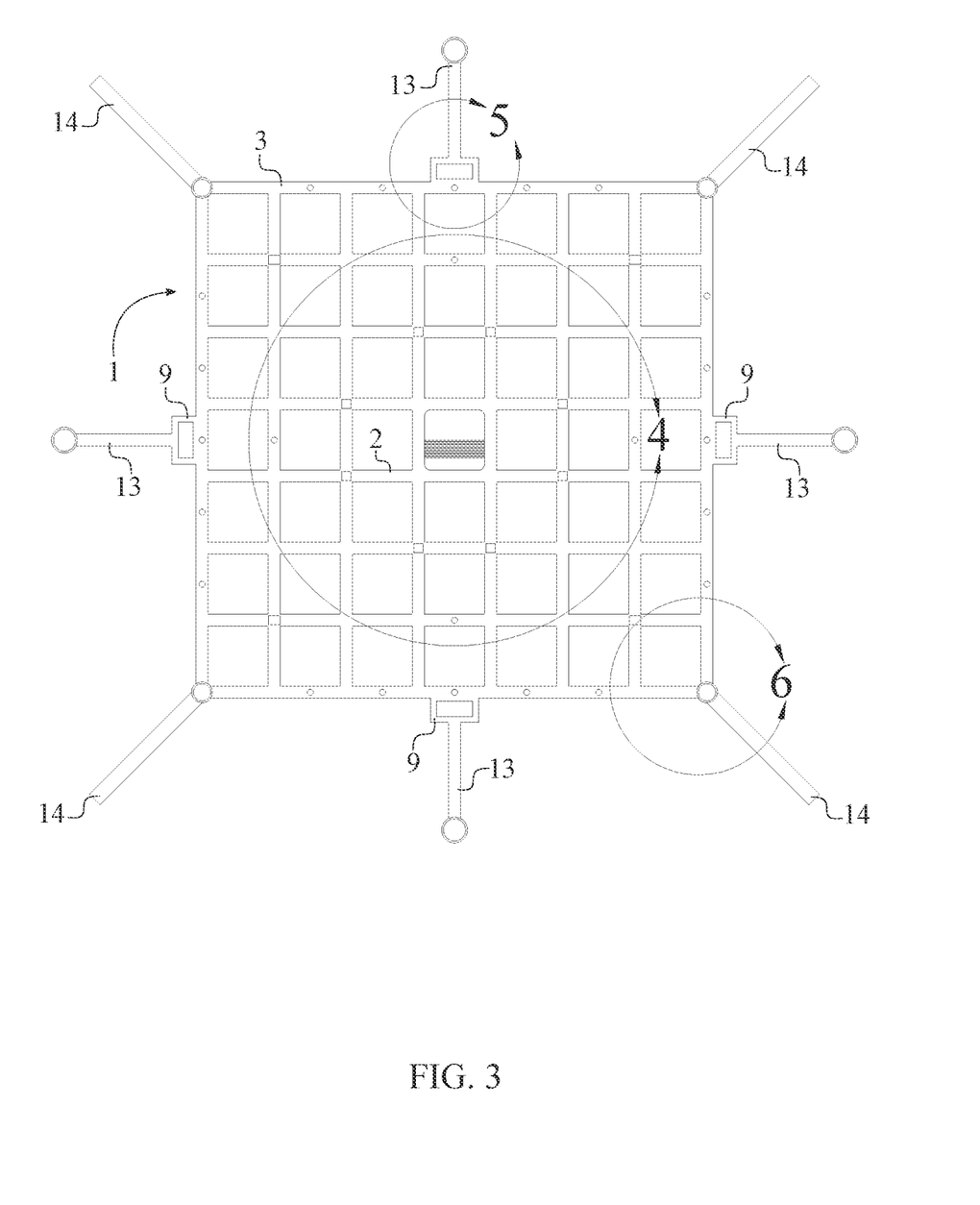
FIG. 3 is a top view of the present invention.
Figure 5:
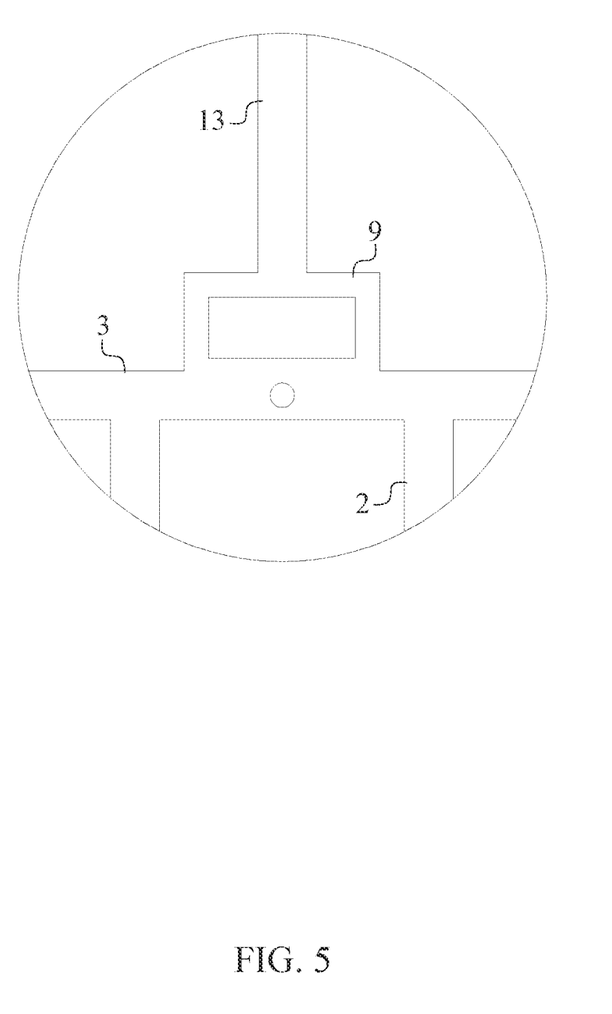
FIG. 5 is a detailed sectional view taken about circle 5 in FIG. 3.

In reference to FIG. 3 and FIG. 5, the present invention may further comprise at least one barcode displaying section 9. The at least one bar code displaying section 9 is integrated to the outer strap 3 to help identify individual packages. More specifically, the at least one bar code displaying section 9 may comprise a printed-barcode, which can be scanned by a dedicated reader or by a smartphone with a camera during the shipping process. The printed-barcode provides product details corresponding to the package upon which the barcode is affixed, shipping information, special shipping instructions, weight threshold of the plurality of load sensors 4, and other shipping related information. The present invention is preferably configured with four barcode displaying sections 9 so that the shipper can easily scan the printed-barcode from any sides of the package.

In reference to FIG. 1, the present invention may further comprise a plurality of grommets 12 so that the netting body 1 can be secured to the package. Each of the plurality of grommets 12 is integrated into the outer strap 3 and perimetrically positioned along the outer strap 3. More specifically, the plurality of grommets 12 (also referred to as eyelets) is positioned around the perimeter of the netting body 1 thus allowing carabiners, clips, ropes, and similar objects to be coupled to the outer strap 3. These items can then be used to effectively tie the netting body 1 to the package.

In reference to FIG. 3 and FIG. 5, the present invention may further comprise a plurality of first attachment straps 13 to further secure the netting body 1. Each of the plurality of first attachment straps 13 is peripherally positioned along the outer strap 3 and adjacently connected to the outer strap 3. Preferably, each of the plurality of first attachment straps 13 adjacently connected to the outer strap 3 through the at least one barcode displaying section 9 for the convenience access of the at least one barcode displaying section 9. Each of the plurality of first attachment straps 13 functions as an elongated securing strap that is configured into the netting body 1. The present invention is preferably configured with four first attachment straps 13 so that the shipper can easily stretch and secure the netting body 1 with respect to four sides of the package.

Figure 6:
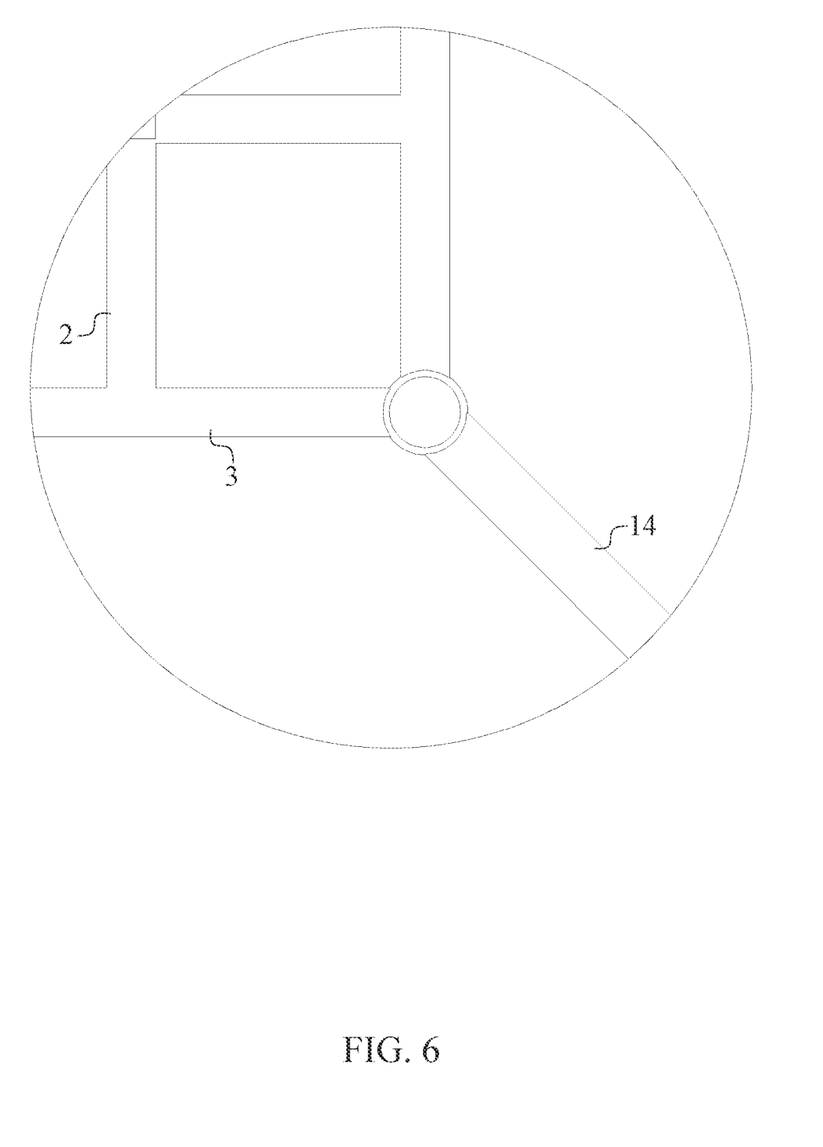
FIG. 6 is a detailed sectional view taken about circle 6 in FIG. 3.

In reference to FIG. 3 and FIG. 6, the present invention may further comprise a plurality of second attachment straps 14 to further secure the netting body 1. Each of the plurality of second attachment straps 14 is peripherally positioned along the outer strap 3 and adjacently mounted to the outer strap 3. Furthermore, each of the plurality of second attachment straps 14 is positioned in between a pair of first attachment straps from the plurality of first attachment straps 13. In other words, each of the plurality of second attachment straps 14 is positioned at a corner of the netting body 1 and functions as an elongated securing strap. The present invention preferably configured with four second attachment straps 14 so that the shipper can easily stretch and secure the netting body 1 with respect to four corners of the package. Preferably, each of the plurality of second attachment straps 14 is mounted to the outer strap 3 via O-ring thus allowing each of the plurality of second attachment straps 14 to be rotated about O-ring.

To improve the reliability of the present invention, the abovementioned components are preferably secured through the use of tamper resistant screws. Some of the components, such as the at least one LED indicator 10 and the speaker 11, are protected by a thermoplastic polyurethane housing that is tough, durable, resistant to fuels, oils, grease, and additionally resistant to flexural fatigue across a wide range of temperature. A rubberized topcoat is also integrated into the netting body 1 to further protection and helps eliminate sharp edges.

To improve usability of the present invention, the electronic application ("app") is preferably provided for installation on the shipper's computing device and the client's computing device. The electronic application provides several capabilities to the shipper as the shipper is able to track multiple items according to the print-barcode. Through the electronic application, the shipper is able to scan a product being shipped into a product database, to which product information can be saved and later retrieved. A number of data files can be saved to the client folder on the database, including a bill of sales, customer info, and product description (which includes weight and size). The electronic application can also be used to take and store pictures of the package prior to shipping; these pictures, similar to data from the plurality of load sensors 4, can be used as evidence if a claim related to shipping damage needs to be made. The pictures effectively show that the product was undamaged prior to being transferred to the possession of the carrier. The electronic application can also track and display both active and inactive devices which are registered to a specific user.

When the package is in the carrier's possession, the electronic application allows for the client to remotely monitor and track the package. Through communication with the GPS unit 5, the electronic application is able to inform the client and shipper of the package location and activation of the plurality of load sensors 4. Data sent from the plurality of load sensors 4 can include, but is not limited to, the weight of the offending load, the specific position of the offending load (determined by comparing weight values measured by individual sensors), and the physical location of the package when the overload occurs. As a result, the client and the shipper is instantly notified when the package is damaged, allowing the client and the shipper to note time, location, and area of the package that is experiencing stress from the load; this data is saved and can later be used to strengthen a claim filed for damaged packages. The present invention helps to reduce damage during shipping and, if damage does occur, aid the shipper and/or the client in filing a claim for shipping damages.

Although the invention has been explained in relation to its preferred embodiment, it is to be understood that many other possible modifications and variations can be made without departing from the spirit and scope of the invention as hereinafter claimed.

What is claimed is:

1. An apparatus to protect and monitor packages during shipment comprising:
   a netting body;
   a plurality of load sensors;
   a global positioning system (GPS) unit;
   a power source;
   a wireless communication unit;
   a chipset;
   the netting body comprising a webbing section and an outer strap;
   the outer strap being perimetrically connected around the webbing section;
   the plurality of load sensors being integrated into the webbing section;
   the GPS unit, the power source, the wireless communication unit, and the chipset being integrated into the webbing section;
   the plurality of load sensors, the GPS unit, the wireless communication unit, and the chipset being electrically connected to the power source; and
   the plurality of load sensors, the GPS unit, and the wireless communication unit being electronically connected to the chipset.

2. The apparatus to protect and monitor packages during shipment as claimed in claim 1 comprising:
   at least one light-emitting diode (LED) indicator;
   the at least one LED indicator being connected onto the webbing section;
   the at least one LED indicator being electrically connected to the power source; and the at least one LED indicator being electronically connected to the chipset.

3. The apparatus to protect and monitor packages during shipment as claimed in claim 1 comprising:
   a speaker;
   the speaker being connected onto the webbing section;
   the speaker being electrically connected to the power source; and
   the speaker being electronically connected to the chipset.

4. The apparatus to protect and monitor packages during shipment as claimed in claim 1 comprising:
   at least one barcode displaying section; and
   the at least one bar code displaying section being integrated to the outer strap.

5. The apparatus to protect and monitor packages during shipment as claimed in claim 1 comprising:
   a plurality of grommets;
   each of the plurality of grommets being integrated into the outer strap; and
   each of the plurality of grommets being perimetrically positioned along the outer strap.

6. The apparatus to protect and monitor packages during shipment as claimed in claim 1 comprising:
   a plurality of first attachment straps;
   each of the plurality of first attachment straps being peripherally positioned along the outer strap; and
   each of the plurality of first attachment straps being adjacently connected to the outer strap.

7. The apparatus to protect and monitor packages during shipment as claimed in claim 6 comprising:
   a plurality of second attachment straps;
   each of the plurality of second attachment straps being peripherally positioned around the outer strap;
   each of the plurality of second attachment straps being positioned in between a pair of first attachment straps from the plurality of first attachment straps; and
   each of the plurality of second attachment straps being adjacently mounted to outer strap.

8. An apparatus to protect and monitor packages during shipment comprising:
   a netting body;
   a plurality of load sensors;
   a global positioning system (GPS) unit;
   a power source;
   a wireless communication unit;
   a chipset;
   at least one light-emitting diode (LED) indicator;
   the netting body comprising a webbing section and an outer strap;
   the outer strap being perimetrically connected around the webbing section;
   the plurality of load sensors being integrated into the webbing section;
   the GPS unit, the power source, the wireless communication unit, and the chipset being integrated into the webbing section;
   the plurality of load sensors, the GPS unit, the wireless communication unit, and the chipset being electrically connected to the power source;
   the plurality of load sensors, the GPS unit, and the wireless communication unit being electronically connected to the chipset;
   the at least one LED indicator being connected onto the webbing section;
   the at least one LED indicator being electrically connected to the power source; and
   the at least one LED indicator being electronically connected to the chipset.

9. The apparatus to protect and monitor packages during shipment as claimed in claim 8 comprising:
   a speaker;
   the speaker being connected onto the webbing section;
   the speaker being electrically connected to the power source; and
   the speaker being electronically connected to the chipset.

10. The apparatus to protect and monitor packages during shipment as claimed in claim 8 comprising:
    at least one barcode displaying section; and
    the at least one bar code displaying section being integrated to the outer strap.

11. The apparatus to protect and monitor packages during shipment as claimed in claim 8 comprising:
    a plurality of grommets;
    each of the plurality of grommets being integrated into the outer strap; and
    each of the plurality of grommets being perimetrically positioned along the outer strap.

12. The apparatus to protect and monitor packages during shipment as claimed in claim 8 comprising:
    a plurality of first attachment straps;
    each of the plurality of first attachment straps being peripherally positioned along the outer strap; and
    each of the plurality of first attachment straps being adjacently connected to the outer strap.

13. The apparatus to protect and monitor packages during shipment as claimed in claim 12 comprising:
    a plurality of second attachment straps;
    each of the plurality of second attachment straps being peripherally positioned around the outer strap;
    each of the plurality of second attachment straps being positioned in between a pair of first attachment straps from the plurality of first attachment straps; and
    each of the plurality of second attachment straps being adjacently mounted to outer strap.

14. An apparatus to protect and monitor packages during shipment comprising:
    a netting body;
    a plurality of load sensors;
    a global positioning system (GPS) unit;
    a power source;
    a wireless communication unit;
    a chipset;
    at least one light-emitting diode (LED) indicator;
    a speaker;
    the netting body comprising a webbing section and an outer strap;
    the outer strap being perimetrically connected around the webbing section;
    the plurality of load sensors being integrated into the webbing section;
    the GPS unit, the power source, the wireless communication unit, and the chipset being integrated into the webbing section;
    the plurality of load sensors, the GPS unit, the wireless communication unit, and the chipset being electrically connected to the power source;
    the plurality of load sensors, the GPS unit, and the wireless communication unit being electronically connected to the chipset;
    the at least one LED indicator being connected onto the webbing section;
    the at least one LED indicator being electrically connected to the power source;

the at least one LED indicator being electronically connected to the chipset;

the speaker being connected onto the webbing section;

the speaker being electrically connected to the power source; and the speaker being electronically connected to the chipset.

15. The apparatus to protect and monitor packages during shipment as claimed in claim 14 comprising:
   at least one barcode displaying section; and
   the at least one bar code displaying section being integrated to the outer strap.

16. The apparatus to protect and monitor packages during shipment as claimed in claim 14 comprising:
   a plurality of grommets;
   each of the plurality of grommets being integrated into the outer strap; and
   each of the plurality of grommets being perimetrically positioned along the outer strap.

17. The apparatus to protect and monitor packages during shipment as claimed in claim 14 comprising:
   a plurality of first attachment straps;
   each of the plurality of first attachment straps being peripherally positioned along the outer strap; and
   each of the plurality of first attachment straps being adjacently connected to the outer strap.

18. The apparatus to protect and monitor packages during shipment as claimed in claim 17 comprising:
   a plurality of second attachment straps;
   each of the plurality of second attachment straps being peripherally positioned around the outer strap;
   each of the plurality of second attachment straps being positioned in between a pair of first attachment straps from the plurality of first attachment straps; and
   each of the plurality of second attachment straps being adjacently mounted to outer strap.

* * * * *